Patented Sept. 9, 1952

2,610,129

UNITED STATES PATENT OFFICE 2,610,129

SYNTHETIC RUTILE AND METHOD OF MAKING

William G. Eversole and Wilfred Drost, Kenmore, N. Y., assignors, by mesne assignments, to Union Carbide and Carbon Corporation, a corporation of New York No Drawing. Application March 22, 1949, Serial No. 82,927

11 Claims. (Cl. 106—42)

This invention relates to blue single crystals of synthetic rutile, and to a method for making such crystals.

Single crystals of rutile ($TiO_2$) have only recently been produced synthetically by periodically passing small amounts of titania powder axially down through an oxy-hydrogen flame onto a support which is aligned axially with such flame, and causing the material melted in the flame to crystallize progressively by moving the support and flame apart axially of the flame. The general procedure is similar to the process for making synthetic sapphire disclosed by Verneuil in U. S. Patent 988,230, and similar apparatus is used. When substantially pure titania powder is used unmixed with any other material, the crystal is black, opaque, and unsuitable for use as a gemstone.

The object of the present invention is to produce a blue single crystal of synthetic rutile which is suitable to be cut and used as a gemstone.

In accordance with this invention, a black single crystal of synthetic rutile is grown from a powder mixture consisting of titania ($TiO_2$) and a minor amount of at least one substance selected from the group consisting of tantalum oxide ($Ta_2O_5$) and columbium oxide ($Cb_2O_5$) by fusing the powder in an oxy-hydrogen flame and allowing the fused material to crystallize progressively, in accordance with Verneuil's teachings with reference to sapphire. Preferably the tantalum oxide and/or columbium oxide should be present in an effective amount up to about 1% of the mixture by weight.

The black rutile crystal is then heated in an atmosphere of oxidizing gas such as oxygen, whereupon it is converted to a blue crystal which is suitable for cutting into a gemstone. The depth of the blue color will vary to some extent as the amount of tantalum oxide and/or columbium oxide is varied. The temperature during this step desirably is maintained above 300° C. but below the melting point of rutile. The preferred temperature range is from 600° C. to 1300° C.

In an example of the invention, a short thick black rutile boule weighing about 80 carats was grown successfully from a powder mixture consisting of $TiO_2$ and 0.05% of $Ta_2O_5$. This boule was then oxidized by heating it in a furnace for ten hours at 1150° C. in an atmosphere of oxygen, whereupon the color was converted to a deep blue. Boules grown from powder mixtures containing 0.01% and 0.0025% of $Ta_2O_5$ were medium blue and light blue, respectively, after such an oxidizing treatment.

In a second example, a black boule was grown from a powder mixture consisting of $TiO_2$ and 0.05% $Cb_2O_5$. This boule after oxidizing by heating as described above was converted to a blue color.

What is claimed is:

1. A single crystal of synthetic rutile consisting of titania and an effective amount up to about 1% of at least one substance selected from the group consisting of tantalum oxide and columbium oxide.

2. A blue single crystal of synthetic rutile consisting of titania and an effective amount up to about 1% of at least one substance selected from the group consisting of tantalum oxide and columbium oxide.

3. A blue single crystal of synthetic rutile consisting of titania and about 0.05% of tantalum oxide.

4. A method for synthesizing a single crystal of rutile which can be converted to a blue color by heat treatment in an oxidizing atmosphere, said method comprising fusing a powder consisting of titania and an effective amount up to about 1% of at least one substance selected from the group consisting of tantalum oxide and columbium oxide, and crystallizing the fused material.

5. A method for synthesizing a blue single crystal of rutile comprising fusing a powder consisting of titania and an effective amount up to about 1% of at least one substance selected from the group consisting of tantalum oxide and columbium oxide, crystallizing the fused material, and heating the crystallized material in an oxidizing atmosphere of oxidizing gas.

6. A method for synthesizing a blue single crystal of rutile comprising fusing a powder consisting of titania and about 0.05% of tantalum oxide, crystallizing the fused material, and heating the crystallized material in an oxidizing atmosphere of oxidizing gas.

7. A method for growing a single crystal of rutile which can be converted to a blue color by heat treatment in an oxidizing atmosphere, said method comprising periodically passing axially through a flame and melting therein a powdered composition consisting of titania and an effective amount up to 1% of at least one substance selected from the group consisting of tantalum oxide and columbium oxide, accumulating and crystallizing the material so melted on a support aligned axially with such flame, and moving such flame and support apart axially of such flame.

8. A blue single crystal of synthetic rutile consisting of titania and about 0.05% of columbium oxide.

9. A method for synthesizing a blue single crystal of rutile comprising fusing a powder consisting of titania and about 0.05% of columbium oxide, crystallizing the fused material, and heating the crystallized material in an oxidizing atmosphere of oxidizing gas.

10. A method for making a blue single crystal of rutile comprising periodically passing axially through a flame and melting therein a powdered composition consisting of titania and an effective amount up to 1% of at least one substance selected from the group consisting of tantalum oxide and columbium oxide, accumulating and crystallizing the material so melted on a support aligned axially with such flame, moving such flame and support apart axially of such flame, and subsequently heating the crystallized material in an atmosphere of oxygen at a temperature between 300° C. and 1300° C.

11. A composition of matter for synthesizing single crystals of rutile consisting of a fusible powdered mixture of titania and an effective amount up to about 1% of at least one material selected from the group consisting of tantalum oxide and columbium oxide.

WILLIAM G. EVERSOLE.
WILFRED DROST.

REFERENCES CITED

The following references are of record in the file of this patent:

UNITED STATES PATENTS

| Number | Name | Date |
|--------|------|------|
| 988,230 | Verneuil | Mar. 28, 1911 |